United States Patent [19]
Sakata et al.

[11] Patent Number: 5,497,469
[45] Date of Patent: Mar. 5, 1996

[54] DYNAMIC ADDRESS TRANSLATION ALLOWING QUICK UPDATE OF THE CHANGE BIT

[75] Inventors: Hideki Sakata; Tsutomu Tanaka; Takao Kato; Haruhiko Ueno; Akitoshi Ino; Yoshihiro Kusano, all of Kawasaki, Japan

[73] Assignee: Fujitsu Limited, Kanagawa, Japan

[21] Appl. No.: 939,721

[22] Filed: Sep. 2, 1992

[30]  Foreign Application Priority Data

Sep. 3, 1991 [JP] Japan ................... 3-222575

[51] Int. Cl.⁶ ................................................. G06F 12/10
[52] U.S. Cl. .................... 395/413; 364/DIG. 1; 395/416
[58] Field of Search ...................... 395/400, 425

[56]  References Cited

U.S. PATENT DOCUMENTS

| | | | |
|---|---|---|---|
| 4,084,230 | 4/1978 | Matick | 395/425 |
| 4,638,426 | 1/1987 | Chang et al. | 395/400 |
| 4,658,356 | 4/1987 | Shiozaki et al. | 395/425 |
| 4,731,740 | 3/1988 | Eguchi | 395/400 |
| 4,961,135 | 10/1990 | Uchihori | 395/400 |
| 5,233,700 | 8/1993 | Takagi | 395/400 |
| 5,305,444 | 4/1994 | Becker et al. | 395/400 |
| 5,317,704 | 5/1994 | Izawa et al. | 395/400 |
| 5,386,530 | 1/1995 | Hattori | 395/400 |

FOREIGN PATENT DOCUMENTS

| | | |
|---|---|---|
| 3812602 | 11/1988 | Germany . |
| 60-254345 | 12/1985 | Japan . |

OTHER PUBLICATIONS

*Research Disclosure*, No. 299, Mar. 1989, Havant, GB, XP52970, "Separate Look–Aside Buffer Change Bit Array," p. 2244.

*Primary Examiner*—Michael A. Whitfield
*Attorney, Agent, or Firm*—Staas & Halsey

[57]  ABSTRACT

A dynamic address translation processing apparatus in a data processing system having a main memory for storing an address conversion table, and a central processing unit for converting a virtual address to a real address by referring the address conversion table. The central processing unit includes a first register for holding the virtual address, a second register for holding a table entry of the address conversion table corresponding to the virtual address held in the first register and, having an update bit indicative that a page in memory has been written to a third register for holding the real address of the table entry held in the second register, a comparison circuit for comparing the virtual address held in the first register with the other virtual address to be converted to the real address, and an update unit for updating the update bit in the table entry held in the second register. When the virtual address coincides with the other virtual address in the comparison circuit, the table entry converted by the update unit is written into an address of the main memory held in the third register.

4 Claims, 9 Drawing Sheets

DYNAMIC ADDRESS TRANSLATION ALLOWING QUICK UPDATE OF THE CHANGE BIT

BACKGROUND OF THE INVENTION

1. Field of the Invention

The present invention relates to a dynamic address translation (below, DAT) processing apparatus in a data processing system, and particularly, it relates to a DAT processing apparatus enabling high speed updating of a change bit contained in a page table entry stored in a main memory to improve performance of a data processing system.

2. Description of the Related Art

Virtual memory systems are widely used in data processing systems. In a virtual memory system, a programmer can easily write a program, by use of a virtual address space, which uses a considerably larger memory capacity than that of the main memory. Therefore, when the programmer writes a program, he need not consider the capacity of the main memory. In this case, the DAT processing apparatus is provided in hardware (i.e., a central processing unit and a main memory) in the data processing system to realize the virtual memory system.

The virtual address space is held in logical memory which includes the main memory and all external memories, however only the main memory can be accessed from the central processing unit (CPU) in the hardware. Accordingly, when the CPU accesses a memory location which does not exist in the main memory, that memory location must be moved to the main memory.

The DAT processing apparatus converts a virtual address contained in an instruction of a program to a real address physically stored in the main memory. In the DAT processing apparatus, the main memory is divided into a plurality of page units. The virtual address space is also divided into a plurality of page units to correspond to pages of the main memory.

The virtual address space is further divided into a plurality of segment units, each larger than the page unit. That is, one segment is formed by several page units. Further, the virtual address memory is divided into access units for several steps each larger than a segment unit.

An explanation is given hereinafter of the DAT operation in the case of two access steps, i.e., the page and segment, in this specification.

SUMMARY OF THE INVENTION

The object of the present invention is to provide a DAT processing apparatus in a data processing system enabling high speed updating of a change bit in a page table entry.

In accordance with the present invention, there is provided, in a DAT processing apparatus in a data processing system including a main memory for storing an address conversion table, and a central processing unit (CPU) for controlling a dynamic address translation (DAT) operation to convert a virtual address to a real address by referring to the address conversion table, the central processing unit including; a first register for holding the virtual address, a second register for holding a table entry of the address conversion table corresponding to the virtual address held in the first register, a third register for holding the real address of the table entry held in the second resister, a comparison circuit for comparing the virtual address held in the first register with the other virtual address to be converted to the real address, and an update unit for converting contents of the table entry held in the second register, wherein when the virtual address coincides with the other virtual address in the comparison circuit, the table entry converted by the update unit is written into an address of the main memory held in the third register.

In one preferred embodiment, a table entry of the address conversion table includes an update bit changed from "0" to "1" when the first write operation is executed to the corresponding table; the first, second, and third registers hold the virtual address, the table entry, and the table entry address corresponding to the page at the last fetch in the sequential fetch operation for the dynamic address translation to the main memory; and the update means converts the update bit of the table entry from a bit "0" to "1" so that it is possible to execute the high speed conversion of the update bit at the write operation to the page.

In another preferred embodiment, the central processing unit has an address conversion buffer for storing the virtual address and the corresponding real address and obtaining the real address indexed by the virtual address.

DESCRIPTION OF THE PREFERRED EMBODIMENTS

Before describing the preferred embodiments of the present invention, a conventional DAT processing apparatus and its problems will be explained in detail below.

Figure 1:
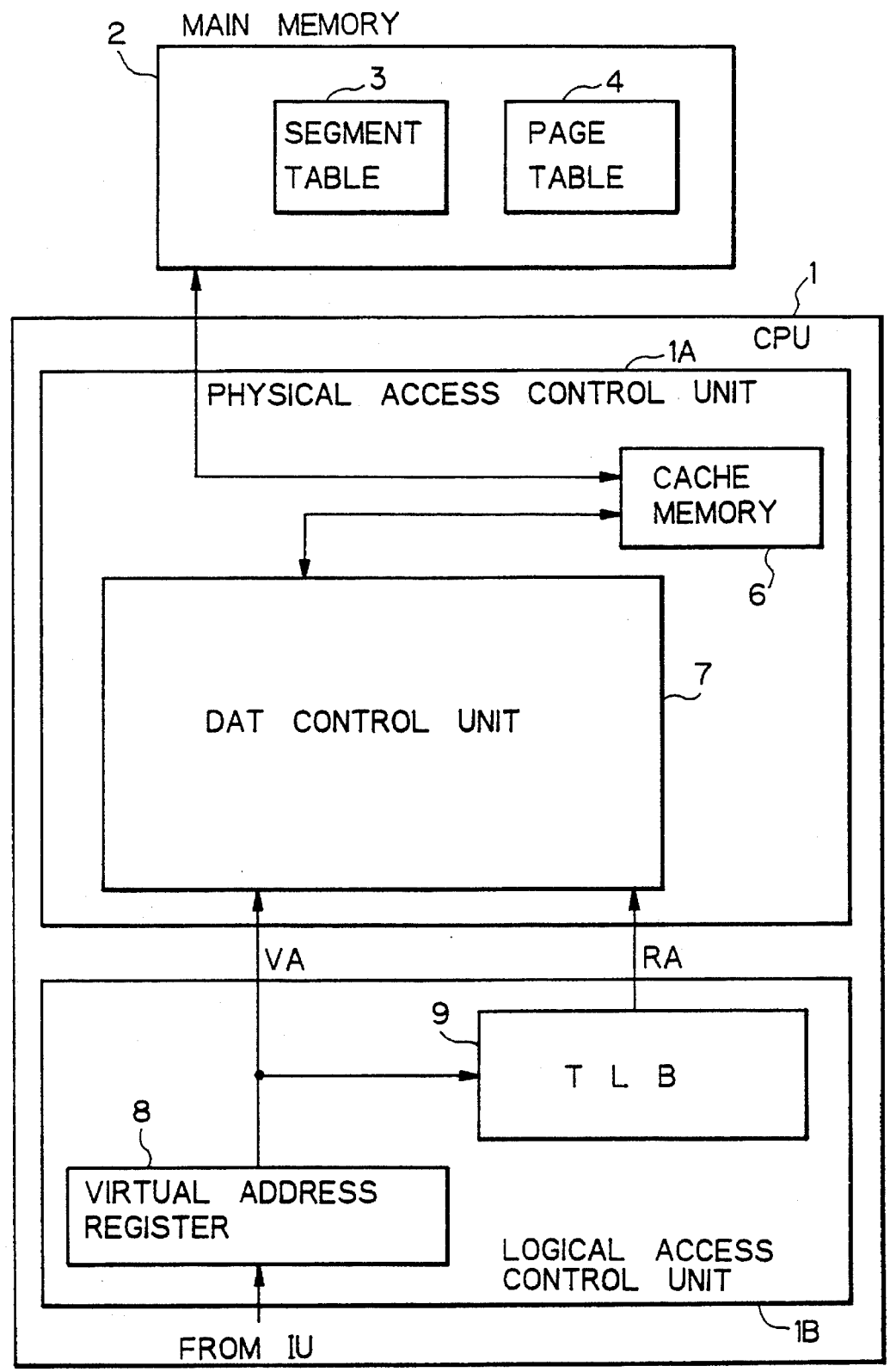
FIG. 1 is a schematic block diagram of a conventional DAT-processing apparatus.

FIG. 1 is a schematic block diagram of a conventional DAT processing apparatus having two access steps. In FIG. 1, reference number 1 denotes a central processing unit (CPU), and reference number 2 denotes a main memory. The main memory 2 stores a segment table 3 and a page table 4 for the DAT operation. The CPU includes a physical access control unit 1A for controlling an access operation by the real address to the main memory 2, and a logical access control unit 1B for controlling an access operation by the virtual address to the virtual memory.

The physical access control unit 1A has a cache memory 6 and a DAT control unit 7 for controlling the DAT operation. The DAT control unit 7 converts the virtual address received from the logical access control unit 1B into the real address and supplies the real address to the main memory 2 and the cache memory 6.

The cache memory 6 is formed by a memory having read/write speed higher than the main memory 2, and preferentially stores the content of the segment table 3 and the page table 4, which are transferred between the main memory 2 and the DAT control unit 7, in accordance with frequency of the access. In the access operation, when the desired data is registered in the cache memory 6, such data is read out therefrom (not the main memory).

The logical access control unit 1B has a virtual address register 8 and a translation lookaside buffer (TLB) 9. The virtual address register 8 inputs the virtual address contained in an operand of the instruction from an instruction unit (IU) which interprets the instruction of the program, and sends that virtual address to the DAT control unit 7. The translation lookaside buffer 9 stores the virtual address and the real address in the form of a corresponding table which is indexed by the virtual address, and outputs the real address therefrom.

Figure 2:
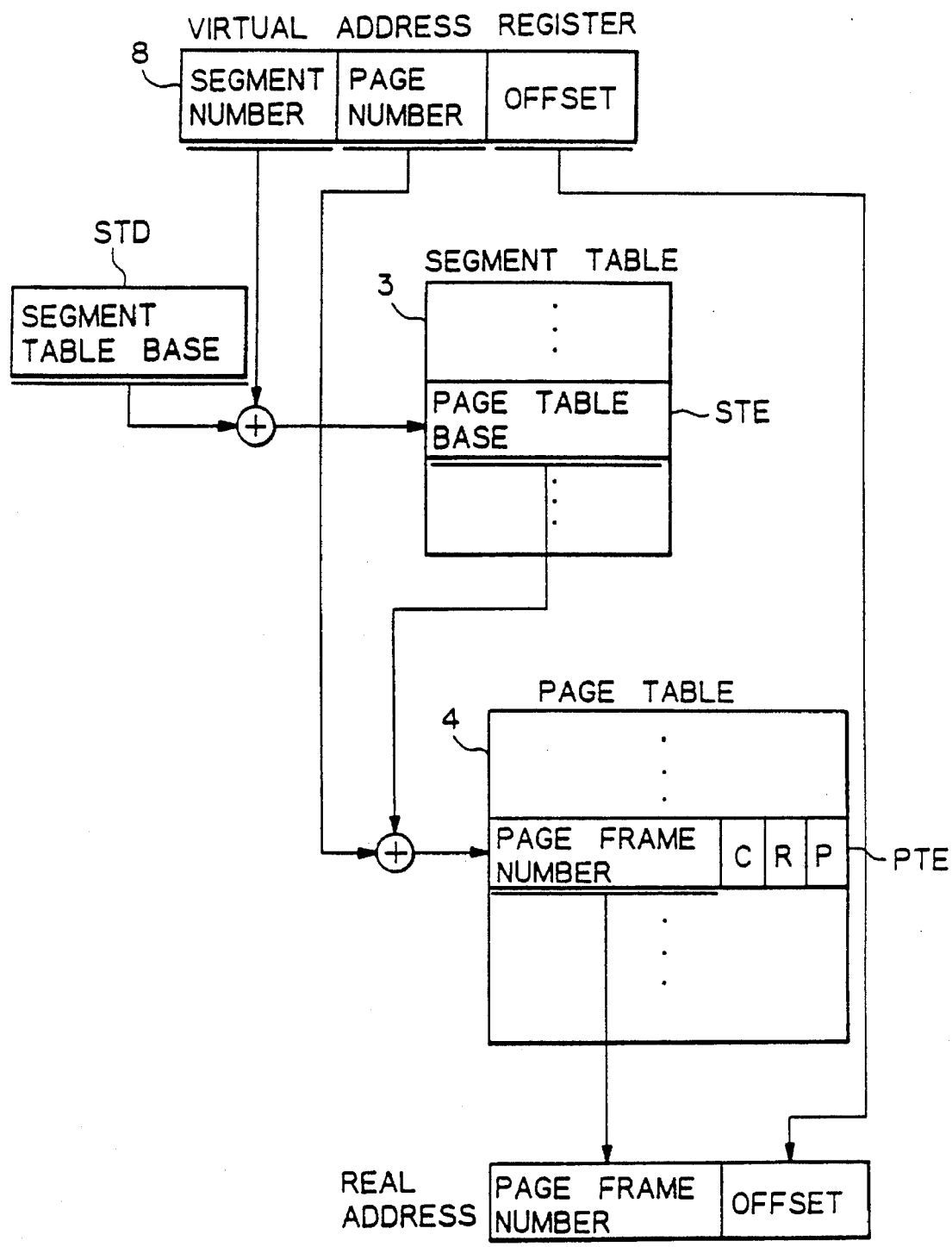
FIG. 2 is a diagram explaining a basic operation of the DAT executed in a prior art DAT control Unit.

FIG. 2 is a diagram explaining a basic operation of the DAT executed in the DAT control unit. In FIG. 2, the virtual address in the virtual address register 8 includes a segment number, a page number and an offset (displacement within the page). A segment table designator STD denotes a register storing a segment table base indicating information regarding a head address and its length of the segment table 3.

The segment table 3 is formed by a plurality of segment table entries (STE), each segment table entry STE including a page table base corresponding to the page table 4. The page table base stores information regarding the head address and the length of the page table 4.

The page table 4 is formed by a plurality of page table entries (PTE). Each page table entry PTE includes a page frame number, an update bit number C, a reference bit R, and a protection bit P. The page frame number denotes an upper bit of the real address to be obtained. The real address can be obtained by coupling the page frame number with the offset contained in the virtual address. The reference bit R is converted from "0" to "1" when the corresponding page is accessed first. The update bit C, i.e. the change bit, is converted from "0" to "1" when the corresponding page is rewritten first. The protection bit P inhibits the write operation when the bit is "1".

The operation of the DAT processing apparatus shown in FIGS. 1 and 2 is explained below.

(1) When an access instruction (i.e., read or write access) for the page and the memory location is issued from the instruction unit IU to the logical access control unit 1B, the virtual address contained in the operand of the instruction is transferred to the DAT control unit 7 through the virtual address register 8.

First, the segment number of the virtual address is checked by the segment table base of the segment table designator STD. If the segment number is not contained in the extent of the segment table, this access is recognized as an "exception".

(2) When the segment number is contained in the extent of the segment table, the real address storing the segment table entry STE is obtained in accordance with the segment table base and the segment number of the virtual address. The segment table entry STE is obtained from the main memory 2 or the cache memory 6 based on this STE address.

(3) The extent of the page number of the virtual address is checked against the obtained segment table entry STE. If the segment number is not contained in the extent of the segment table, this access is recognized as an "exception".

(4) When the page number is contained in the extent of the page table, the real address (i.e., PTE address) storing the page table entry PTE is obtained based on the page table base of the segment table entry STE and the page number of the virtual address. The page table entry PTE is obtained from the main memory 2 based on this PTE address.

(5) When the there is no "exception" in the above conversion steps, and when there is no "exception" of the physical access in the access of the segment table STE and the page table entry PTE, the real address of the memory location is obtained by coupling the offset of the virtual address with the lower page frame number of the page table entry PTE.

The translation lookaside buffer TLB 9 is provided in the recent DAT processing apparatus to simplify the dynamic address translation which obtains the real address by referring to the above segment table and the page table.

The translation lookaside buffer TLB 9 is formed by memory having a high access speed. The translation lookaside buffer TLB 9 stores the virtual address and the real address corresponding to the virtual address, and outputs the real address corresponding to the input virtual address.

The address conversion in the translation lookaside buffer TLB 9 is used as follows.

(1) The virtual address from the virtual address register 8 is input to the translation lookaside buffer TLB 9 prior to the DAT operation by the above conversion table. If the virtual address corresponding to the input virtual address is contained in the translation lookaside buffer TLB 9, such input virtual address enters a "TLB hit" state so that the corresponding real address is immediately taken out from the translation lookaside buffer TLB 9.

(2) If the virtual address corresponding to the input virtual address is not contained in the translation lookaside buffer TLB 9, such an input virtual address enters a "TLB miss hit" state. In this case, the real address is obtained by the DAT operation referring to the above segment table 3 and the page table 4. The real address obtained by the above steps is written in the translation lookaside buffer TLB 9 so that it is possible to obtain a "TLB hit" state for the same virtual address since the real address is already written in the translation lookaside buffer TLB 9.

As explained above, when the write operation is first executed to a page, the update bit C of the page table entry PTE corresponding to the main memory 2 is converted from "0" to "1". The conversion steps of the update C of the page table entry PTE are as follows.

First, the real address of the page table entry PTE is obtained so that the page table entry PTE is read out from the main memory 2 to the CPU 1, and a "1" is written into the update bit C and returned to the main memory 2.

Accordingly, obtaining the real address of the page table entry PTE, which reads out the segment table entry STE from the main memory 2, is always necessary in a conventional DAT processing apparatus regardless of the use of the translation lookaside buffer TLB 9. As a result, since the update bit C must be frequently converted, this step becomes an obstacle to shortening the processing time in the DAT processing apparatus.

Therefore, the object of the present invention is to provide a DAT processing apparatus in a data processing system enabling high speed updating of a change bit of the page table entry.

The structure and operation of the present invention are explained briefly as follows.

In a data processing system according to the present invention, a main memory for storing an address conversion table is provided along with a central processing unit (CPU) for controlling a dynamic address translation to convert a virtual address into a real address by referring to the address conversion table. The CPU comprises a first register for holding the virtual address, a second register for holding a table entry of the address conversion table corresponding to the virtual address held in the first register, a third register for holding a real address of the table entry held in the second register, a comparison circuit for comparing the virtual address held in the first register with the virtual address to be converted to the real address, and an update means for converting the content of the table entry held in the second register. When the former virtual address coincides with the latter virtual address in the comparison circuit, the table entry converted by the update means is written into the address of the main memory held in the third register.

The table entry of the address conversion table of the main memory includes an update bit, i.e. a change bits, changed from "0" to "1" when the write operation is first executed to the corresponding table. The first, second, and third registers hold the virtual address, table entry, and table entry address corresponding to the page at the last fetch in the sequential fetch operation for the dynamic address translation to the main memory. Further, the update means converts the update bit of the table entry from "0" to "1" so that it is possible to execute the high speed conversion of the update bit during the write operation to the page.

The CPU has an address conversion buffer for storing the virtual address and the corresponding real address, and obtaining the real address indexed by the virtual address.

Figure 3:
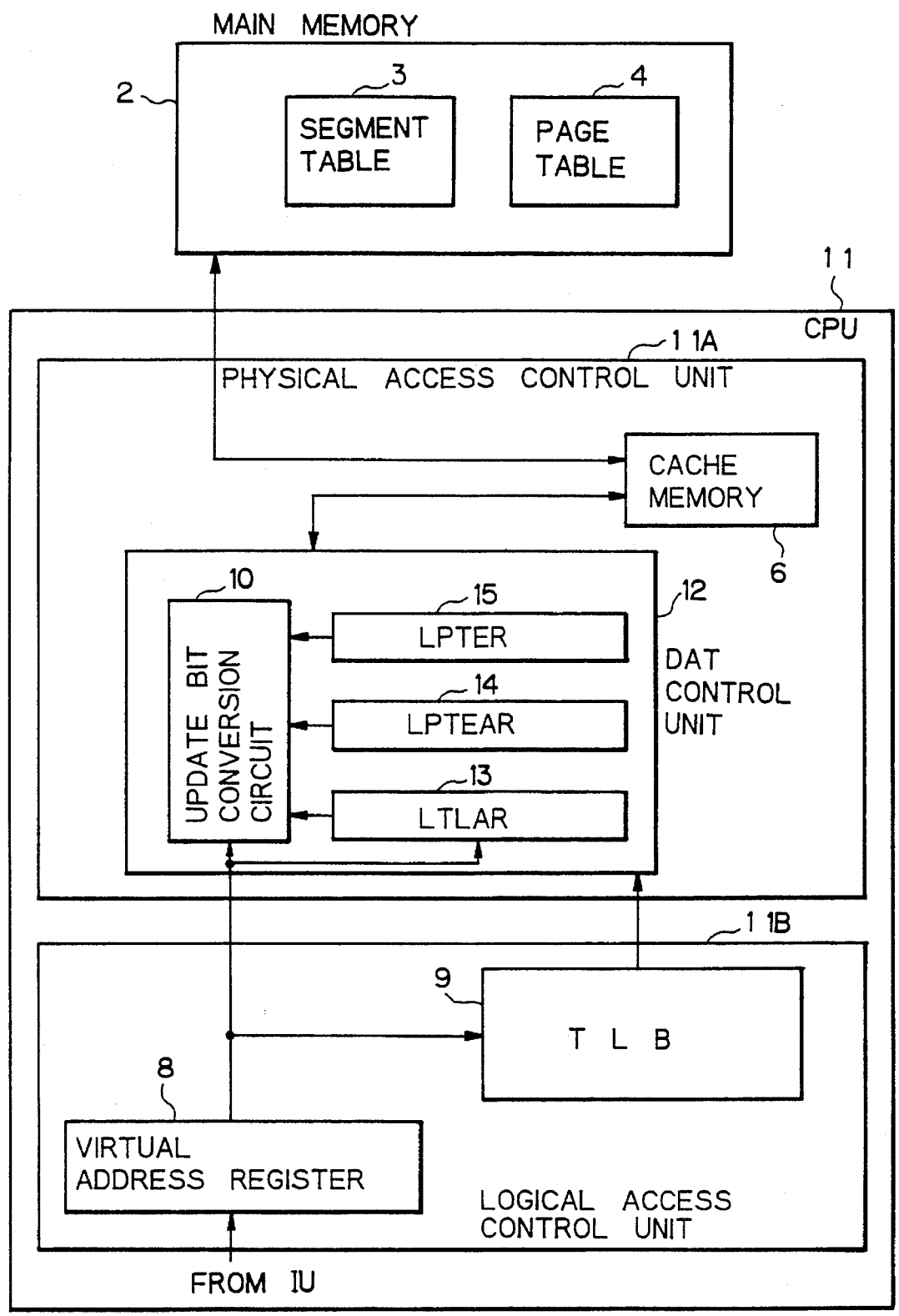
FIG. 3 is a schematic block diagram of a DAT processing apparatus according to an embodiment of the present invention.

FIG. 3 is a schematic block diagram of a DAT processing apparatus according to an embodiment of the present invention. As explained above, the main memory 2 has the segment table 3 and the page table 4. The CPU 11 has the physical access control unit 11A and the logical access control unit 11B. The physical access control unit 11A includes a DAT control unit 12 according to the present invention.

The DAT control unit 12 has three registers, i.e., a last translation logical address register LTLAR 13, a last page table entry address register LPTEAR 14, and a last page table entry register LPTER 15. Further, the DAT control unit 12 has an update bit conversion circuit 10 for converting the update bit of the page table entry from "0" to "1" based on the content of the above three registers 13, 14, and 15.

Figure 4:
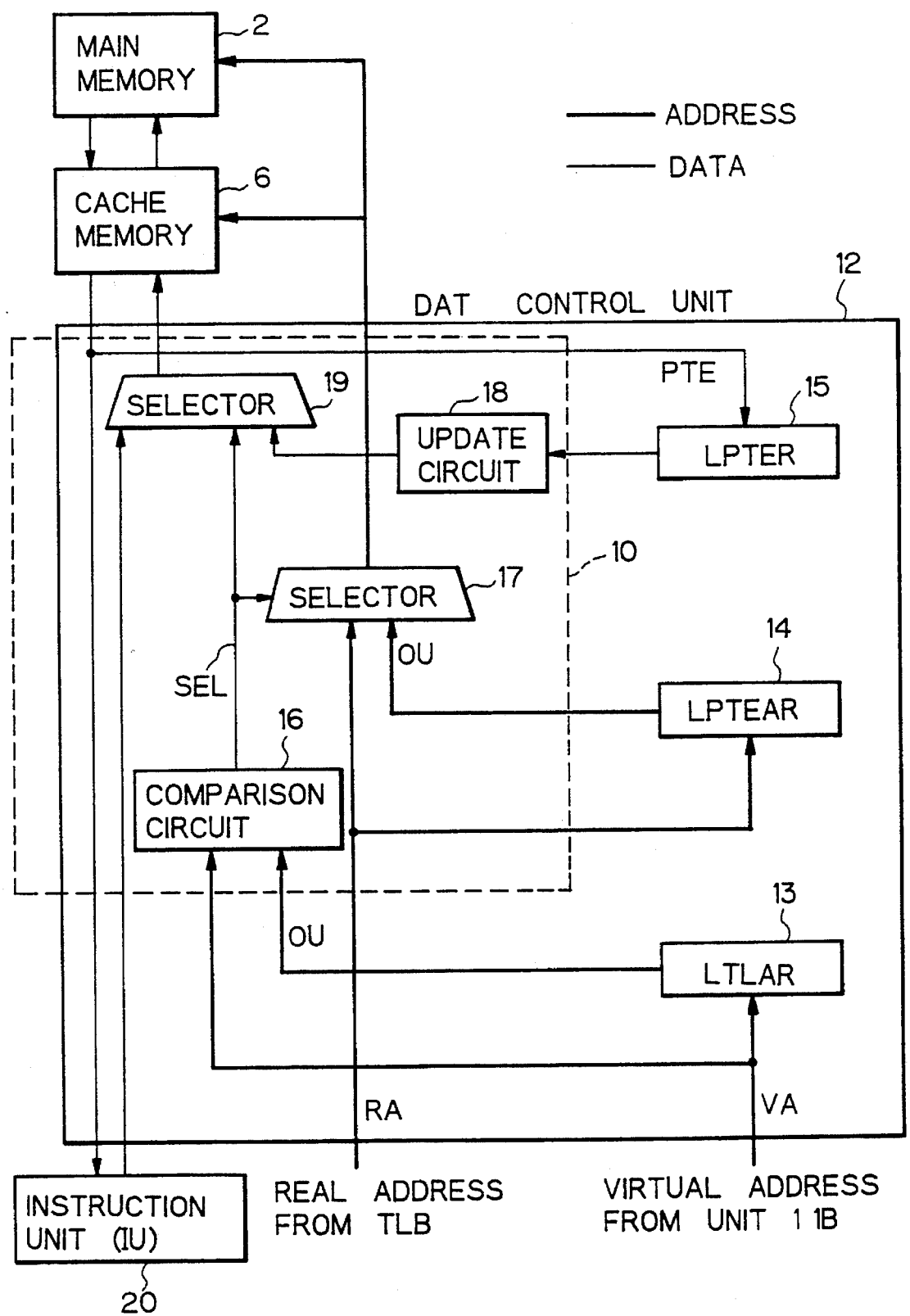
FIG. 4 is a detailed block diagram of a DAT control unit shown in FIG. 3.

FIG. 4 is a detailed block diagram of the DAT control unit shown in FIG. 3. In the DAT control unit 12, as mentioned above, LTLAR 13 denotes the last translation logical address register, LPTEAR 14 denotes the last page table entry address resister, and LPTER 15 denotes the last page table entry register. Further, reference number 16 denotes an address comparison circuit, 17 and 19 denote selectors, and 18 denotes an update circuit. These circuits 16 to 19 are included in the update bit conversion circuit 10 in FIG. 3.

The virtual address VA from the virtual address register 8 is input to the register LTLAR 13 and the comparison circuit 16. The output OU of the register LTLAR 13 is input to the other input terminal of the comparison circuit 16. The comparison circuit 16 compares the virtual address VA with the output OU of the register LTLAR 13. When the virtual address VA and the output OU coincide, the comparison circuit 16 outputs a signal (SEL) equal to "1". When they do not coincide, the circuit 16 outputs a signal (SEL) equal to "0". The bit "1" or "0" of the signal SEL is input to both selectors 17 and 19.

The real address RA from the translation lookaside buffer TLB 9 is input to the selector 17 and the register LPTEAR 14. The output OU of the register LTLAR 14 is input to the other input terminal of the selector 17. The output of the selector 17 denotes the address of the main memory 2 and the cache memory 6. The selector 17 selects the real address RA when the signal SEL from the comparison circuit 16 is equal to "0", and selects the output OU when the signal SEL is equal to "1".

The register LPTER 15 stores the page table entry PTE from the cache memory 6.

The update circuit 18 converts the update bit C of the page table entry PTE of the register LPTER 15 from the bit "0" to "1". The output of the update circuit 18 is input to the other input terminal of the selector 19. The output IU of the instruction unit 20 is input to the selector 19. The selector 19 selects the output IU when the signal SEL is equal to "0", and selects the output from the update circuit 18 when the signal SEL is equal to "1". The data selected by the selector 19 is input to the cache 6.

The operation of the DAT control unit 12 is explained in detail below.

(1) Assuming that no data is written into any one page so that the update bit C of the PTE corresponding to that page is equal to "0". When a sequential fetch operation with the DAT operation is executed to that page, the virtual address at the DAT operation for the last fetch operation is input to the virtual address register LTLAR 13.

(2) The segment table entry STE (i.e., LPTEA) and the page table entry PTE (i.e., LPTE) at the last fetch operation are stored in the resisters LPTEAR 14 and resister LPTER 15. The update circuit 18 converts the update bit C of the PTE of the register LPTER 15 from "0" to "1".

(3) Next, when the write instruction to the page is issued, the virtual address in the write instruction operand is input to the DAT control unit 12. The address comparison circuit 16 compares the output of the register LTLAR 13 with the new virtual address, and sets the signal SEL to "1" since the output of the register LTLAR 13 and the new virtual address coincide in this case.

(4) The selector 17 outputs the address of the main memory 2 and the cache 6 from the resister LPTEAR 14 when the signal SEL is equal to "1". The update circuit 18 outputs the PTE in, which the update bit C has been converted from "0" to "1", to the selector 19.

(5) The selector 19 transfers the PTE (the update bit C of this PTE is already updated) to the main memory 2 through the cache memory 6 since the signal SEL is equal to "1". Accordingly, the conversion of the update bit of the PTE of the main memory 2 is completed based on the above steps.

(6) The selector 17 selects the address of the main memory 2 and the cache memory 6 from the output of the TLB 9. In this case, the selector 19 selects the data from the instruction unit 20 and outputs it to the main memory 2 and the cache memory 6.

As explained above, according to this embodiment, after the last fetch operation in the sequential fetch operation to any one page, when executing the write operation to the same page, it is possible to convert the update bit C of the PTE without getting the PTE address.

Figure 5:
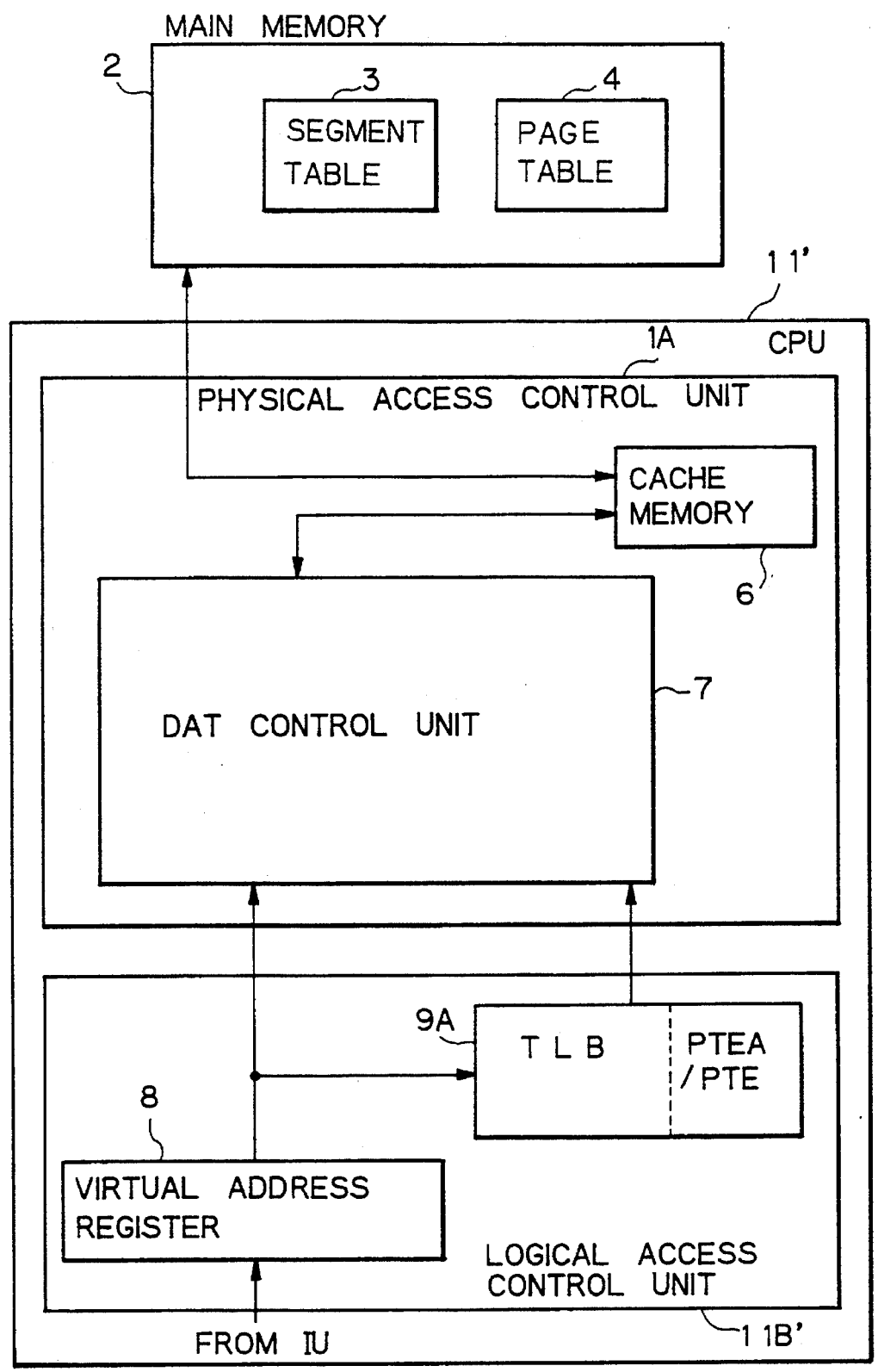
FIG. 5 is a schematic block diagram of another embodiment of the present invention.

FIG. 5 is a schematic block diagram of another embodiment of the present invention. In this embodiment, the DAT control unit 12 is the conventional type, but the translation lookaside buffer TLB is improved. That is, as shown in FIG. 5, the translation lookaside buffer TLB 9A in the logical access control unit 11B' includes the page entry table PTE and the PTE address (PTEA/PTE). According to this structure, it is possible to obtain the PTE and PTE address at high speed so that it is possible to execute the conversion of the update bit at high speed.

Figure 6:
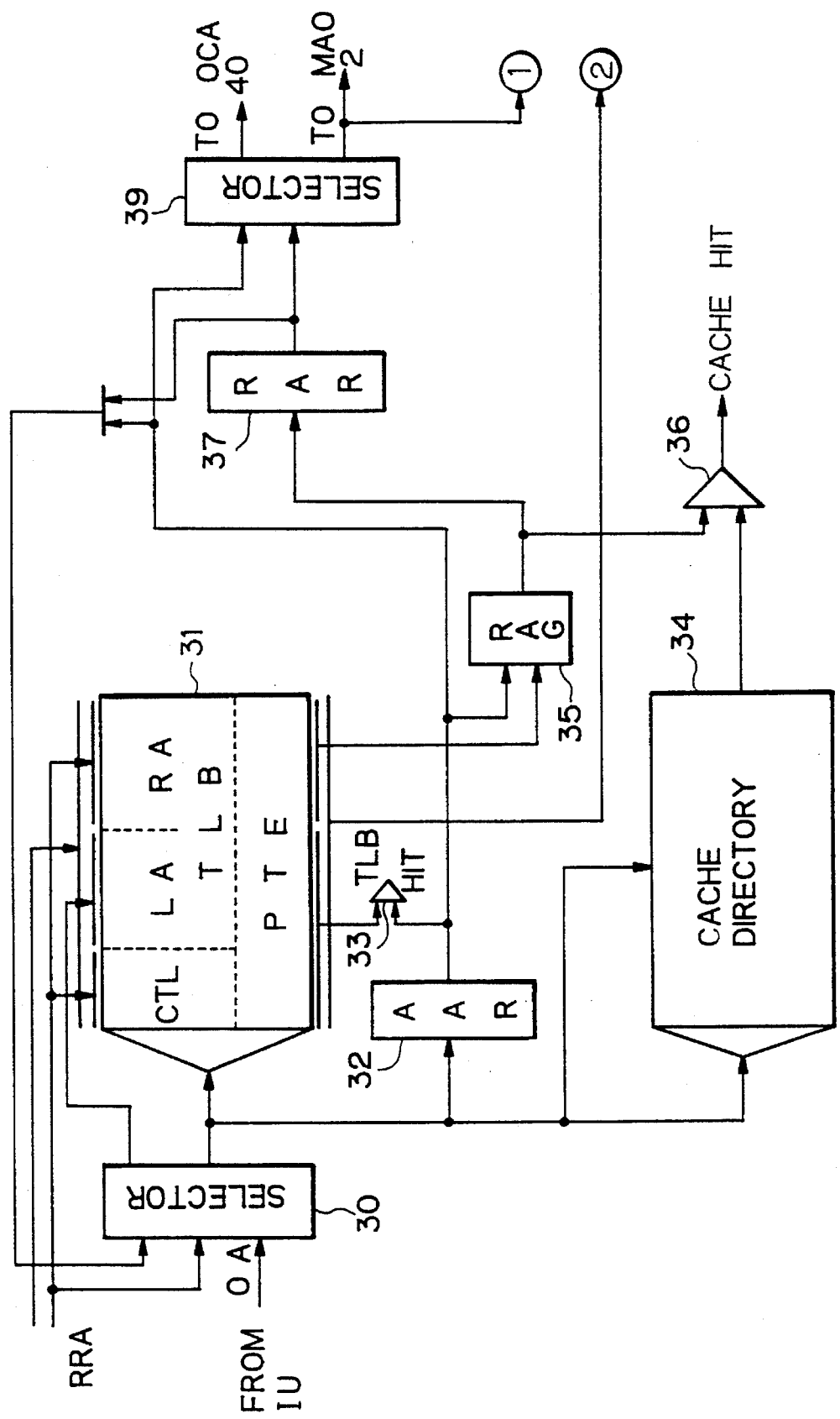
FIG. 6 is a detailed block diagram of another embodiment of the structure shown in FIG. 3.
Figure 7:
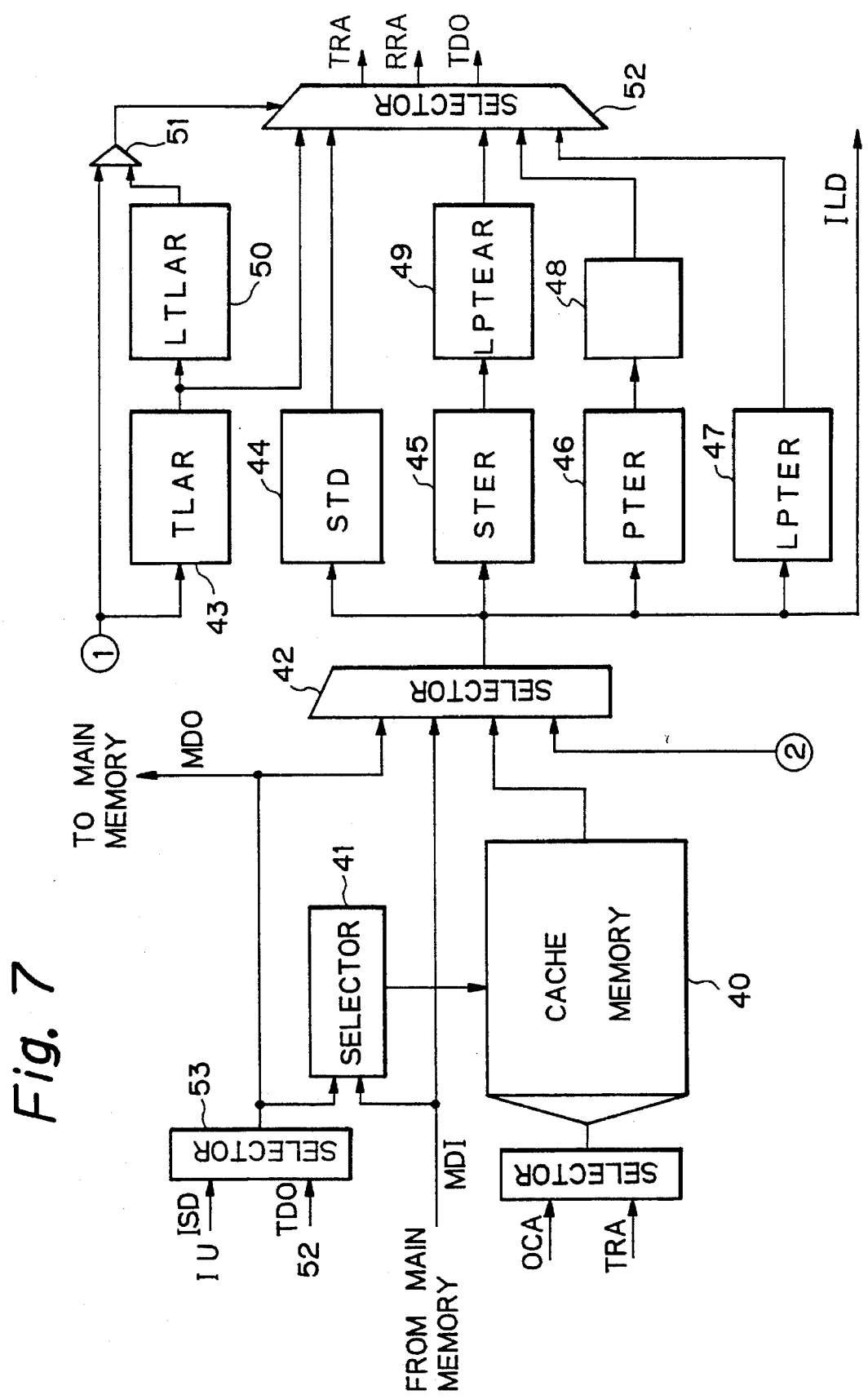
FIG. 7 is a detailed block diagram connected to the structure shown in FIG. 6.

FIG. 6 is a detailed block diagram of another embodiment of the structure shown in FIG. 3, and FIG. 7 is a detailed block diagram connected to the structure shown in FIG. 6.

In FIG. 6, the virtual address (operand address OA) of the instruction from the instruction unit (IU) is input to the translation lookaside buffer TLB 31 through the selector 30, and this address OA is used as an index for the translation lookaside buffer TLB 31.

The address to the main memory 2 is a main memory address output MAO which is output from the selector 39. Further, the address to the cache memory 40 (i.e., operand cache address: OCA) is output from the selector 39. The output of the selector 30 is input to the translation lookaside buffer TLB 31, the access address register AAR 32, and the cache directory 34.

In FIG. 7, the instruction store data ISD from the instruction unit 20 is output to the main memory 2 as a main memory data output MDO through the selector 53, and 13 written to the cache memory 40 through the selector 41.

The data MDI from the main memory 2 is transferred to the instruction unit (IU) 20 through the selector 42, and loaded into the registers 44 to 47 through the selector 42. Further, the data MDI is written to the cache memory 40 through the selector 41.

The translation lookaside buffer TLB 31 has two large areas. The first area, in an upper portion, has the control bit CTL (i.e., the update bit C, the reference bit R, and the protection bit P), the logical address LA (the segment number and page number), and the real address RA (the page frame number). The second area, in a lower portion, has the page table entry PTE and the PTE address PTEA.

If the logical address LA coinciding with the virtual address from the selector 30 exists, the translation lookaside buffer TLB 31 outputs it to the comparator 33. The comparator 33 compares the real address LA from the translation lookaside buffer TLB 31 with the content of the register AAR 32, and outputs a "TLB hit" signal if the real address LA and the content coincide. The real address RA corresponding to the logical address LA is output to a real address generator RAG 35.

The real address generator RAG 35 generates the real address based on the real address RA from the translation lookaside buffer TLB 31 and a part of the address signal from the register AAR 32, and outputs the real address to the real address register RAR and the comparator 36.

The comparator 36 outputs a register signal indicating whether or not the data corresponding to this real address is registered in the cache memory 40 (i.e., cache hit). This is based on the real address from the real address generator RAG 35 and the output from the cache directory 34. This register signal is used for determining whether the data should be read out from the cache memory 40 or the main memory 2.

Further, the translation lookaside buffer TLB 31 outputs the page table entry PTE and the PTE address. If the PTE and the PTE address corresponding to the virtual address exist in the translation lookaside buffer TLB 31, the page table entry PTE is transferred to the PTER 46 and the register LPTER 47 through the selector 42 as shown in FIGS. 6 and 7. The PTEA is transferred from the TLB 31 to the register PTEAR 38 (see FIG. 8). The register RAR 37 transfers the real address to the cache memory 40 as the operand cache address OCA through the selector 39, and transfers the real address to the main memory 2 as the main memory address MAO.

The output of the access address register AAR 32 is supplied to the translation logic address register TLAR 43 and the comparator 51 through the selector 39, and again supplied to the selector 30 after a short wait time.

As shown in FIG. 7, the output of the translation logic address register TLAR 43 is also supplied to the virtual address register LTLAR 50 and the selector 52. The register LTLAR 50 is the register holding the virtual address at the dynamic address translation for the last fetch operation in the sequential fetch operation to the page. The output of the register LTLAR 50 is compared by the comparator 51 with the virtual address from the access address register AAR 32. The result of the comparison by the comparator 51 becomes the control input of the selector 52.

The selector 52 receives the segment table base from the segment table designator STD 44, the segment table entry STE (or page table entry address PTEA) from the segment table entry register STER 45 and the last page table entry address register LPTEAR 49, the page table entry PTE from the page table entry register PTER 46, and the page table entry PTE from the update circuit 48.

The selector 52 selects the above various inputs so as to execute the dynamic address translation. The selector 42 transfers the real address to the cache memory 40 as the translation real address TRA, transfers the real address to the translation lookaside buffer TLB 31 as the return real address RRA, and transfers the real address to the cache memory 40 and the main memory 2 as the translation data output TDO through the selector 53.

The selector 42 receives the data MDI from the main memory, the store data ISD from the instruction unit IU, the translation data output from the selector 52, the output from the cache memory 40, and the page table entry PTE from the translation lookaside buffer TLB 31. The selector selects these and outputs to the instruction unit 20 or the registers 44 to 47.

The registers LTLAR 50, LPTEAR 49, and LPTER 47 hold the virtual address, the PTE address, and the PTE at the DAT operation for the last fetch in the sequential fetch operation.

The update circuit 48 converts the update bit C of the PTE from "0" to "1" when the PTE for the last fetch operation is held in the register LPTER 47.

Assuming that the write operation is executed to any one page, the update bit C corresponding to the PTE is equal to "0", and the sequential fetch operation with the dynamic address translation is executed to that page.

The operand address OA of the read instruction from the instruction unit IU 20 is input to the translation lookaside buffer TLB 31, the access address register 32, and the cache directory 34. Whether or not the content of that page is stored is shown by the comparator 36. If the content exists in the cache 40, the content is read therefrom.

When the logical address LA corresponding to the operand address OA is not registered in the translation lookaside buffer TLB 31, the logical address LA is output to the comparator 33 and compared with the virtual address from the access address register AAR 32. When the logical address and the virtual address coincide, the "TLB hit" signal which indicates existence of the real address corresponding to the logical address in the translation lookaside buffer TLB 31 is output from the comparator 33.

When the "TLB hit" occurs, the real address RA corresponding to the logical address LA is taken from the translation lookaside buffer TLB 31 and input to the real address generator RAG 35. The real address generator RAG 35 generates the real address of the memory location for the object, in accordance with the real address RA taken out from the TLB 31 and the offset contained in the operand address OA from the access address register 32, and outputs the real address to the real address register RAR 37.

The real address register RAR 37 transfers the real address to the selector 39. The selector 39 transfers the real address from the real address register RAR 37 to the main memory 2 as the main memory address MAO, or transfers the operand address OA from the access address register AAR 32 to the cache memory 40 as the operand cache address OCA when the data is registered in the cache memory 40.

When the data is registered in the cache memory 40, the data is read and transferred to the instruction unit IU 20 through the selector 42. When the data is not registered in the cache memory 40, the input data MDI from the main memory 2 is transferred to the instruction unit IU 20 through selector 42.

When the "TLB hit" does not occur (i.e., when there is a "TLB miss hit"), the normal DAT operation is executed as described in FIG. 2. In this case, the operand address OA stored in the access address register 32 is transferred to the selector 52 through the selector 39 and the translation logical address register TLAR 43.

The selector 52 obtains the real address of the segment table entry STE in accordance with the segment index in the virtual address from the register TLAR 43 and the segment table base from the segment table designator STD 44, and outputs the real address to the cache memory 40 as the translation real address TRA. The cache memory 40 outputs the corresponding segment table entry STE to the segment table entry register STER 45.

Next, the real address of the PTE is obtained from the STE and the page index of the virtual address so that the desired PTE is taken out from the cache memory 40 and transferred to the selector 52 through the page table entry register PTER 46. The selector 42 returns the page table entry PTE to the translation lookaside buffer TLB 31 which writes the page frame number and the control bit of the PTE to the real address RA and the control CTL.

The real address RA written into the TLB 31 is read to the real address generator RAG 35 in response to the "TLB hit" so that the real address becomes the real address of the memory location coupled with offset from the access address register AAR 32 and is stored in the real address register RAR 37.

Assuming that only a read operation with the DAT operation is executed, the update bit C corresponding to the PTE is equal to "0". The real address is taken out from the translation lookaside buffer TLB 31 for every issuance of the read instruction from the instruction unit IU 20 so that the data is read out from the main memory 2 or the cache memory 40 and is transferred to the instruction unit IU 20 as the instruction load data ILD.

In FIGS. 6 and 7, after several DAT operation are executed for fetch operation to the same page, in the last fetch operation, the virtual address, the PTE address, and the PTE are stored in the registers LTLAR 50, LPTEAR 49, and LPTER 47, respectively. The update circuit 48 converts the update bit C of the PTE held in the register LPTER 47 from "0" to "1". Further, the content of the register LPTEAR 49 and the register LPTER 47 are written into the columns of the PTEA and PTE of the translation lookaside buffer TLB 31.

After that, when a page other than the same page P1 is accessed, since the result of comparison does not coincide in the comparison unit 47, it holds the virtual address, the PTE address and the PTE regarding the page P1.

Then, assuming that the first write instruction to the page P1 is issued from the instruction unit IU 20, since the real address RA of such page is registered in the translation lookaside buffer TLB 31, the real address is immediately obtained so that the instruction store data ISD of the instruction unit IU 20 is written into the main memory address designated by the address MAO.

At this time, since this is the first write operation to the page P1, it is necessary to convert the corresponding update bit C of the PTE from the "0" to "1". Since the new input virtual address and the virtual address are held in the register LTLAR 50, the selector 52 supplies the output of the register LPTEAR 49 as the address TRA of the cache memory 40, and the output of the update circuit 48 is transferred to the cache memory 40 as the translation data output TDO.

Accordingly, the PTE, of which the update bit C is converted to "1", is written into the cache memory 40. Further, the corresponding PTE and the PTEA are read out from the TLB 31. The PTEA supplies the address to the main memory 2 through the register PTEAR 38 and the selector 39 (see, FIG. 8), and the PTE is written into the page table 4 of the main memory 2 through the selector 42, the register LPTER 47, the update circuit 48, and the selectors 52 and 53.

As explained above, at the last fetch operation in the sequential fetch operation to the page based on the DAT operation, the PTEA (see, FIG. 8) and PTE are held in the registers LPTEAR 49 and the register LPTER 47, and also held in the TLB 31. Then, in the first write operation to the same page, the update bit C of the PTE is converted from the bit "0" to "1", and the updated PTE is written into the main memory 2 and the cache memory 40. Accordingly, when the first write operation is executed to that page, it is not necessary to obtain the PTE address.

According to the present invention, in a DAT processing apparatus which the update bit is held in the PTE and converted from the bit "0" to "1" when the first write operation is executed to the page corresponding to the PTE, it is not necessary to obtain the PTE address from the main memory for the conversion of the update bit of the PTE in the first write operation. Accordingly, it is possible to improve the throughput of a data processing system.

Figure 8:
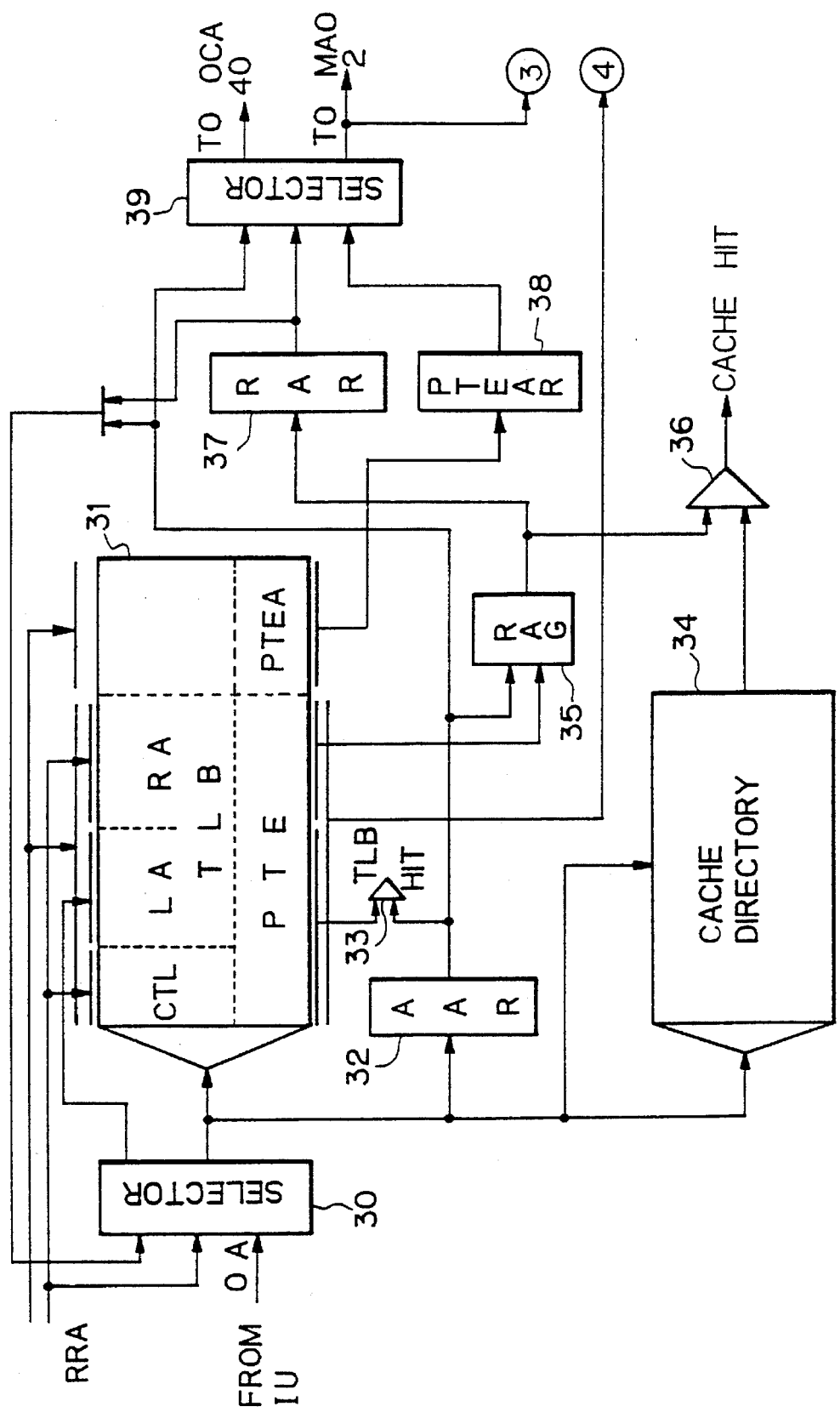
FIG. 8 is a detailed block diagram of another embodiment of the structure shown in FIG. 5.
Figure 9:
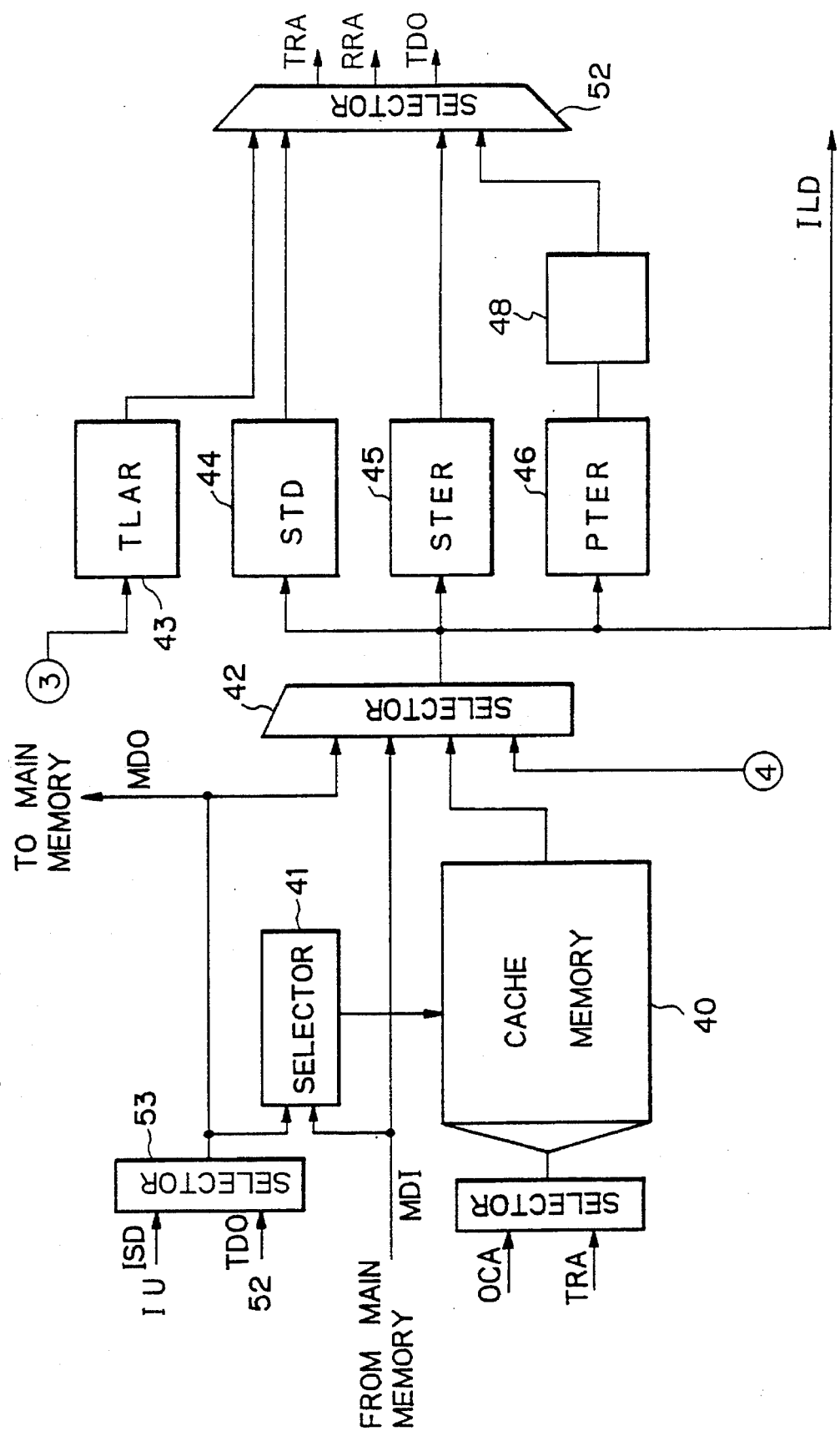
FIG. 9 is a detailed block diagram connected to the structure shown in FIG. 8.

FIG. 8 is a detailed block diagram of another embodiment of the structure shown in FIG. 5, and FIG. 9 is a detailed block diagram connected to the structure shown in FIG. 8. As is obvious from the drawing, the translation lookaside buffer TLB 31 further includes the page table entry address PTEA. Accordingly, the PTEA register PTEAR 38 is provided between the PTEA and the selector 39.

In this embodiment, the registers LTLAR 13, LPTEAR 14, and LPTER 15 are not necessary as shown in FIG. 9. That is, the registers LTLAR 50, LPTEAR 49 and LPTER 47 are deleted from the structure shown in FIG. 7 in this embodiment. The enlarged translation lookaside buffer TLB 31 in FIG. 8 has the page table entry PTE and the page table entry address PTEA, and the contents of the PTE and the PTEA are used for the DAT operation as shown in FIG. 5.

We claim:

1. A virtual memory data processing system comprising:
   a main memory for storing an address conversion table; and
   a central processing unit for performing a dynamic address translation operation to translate a virtual address to a real address by referring to the address conversion table, said central processing unit comprising:
   first storage means for holding a prior translated virtual address;
   second storage means for holding a table entry of the address conversion table corresponding to the virtual address held in the first storage means, said table entry having an update bit indicating that the memory has been written to;
   third storage means for holding the real address of the table entry held in the second storage means;
   comparison means for comparing the prior translated virtual address held in the first storage means with a virtual address to be translated to a real address; and
   update means for changing contents of the update bit in the table entry held in the second storage means when the virtual memory has been written to, wherein when the virtual address coincides with the other virtual address in the comparison circuit, the table entry changed by the update means is written into an address of the main memory held in the third storage means.

2. A dynamic address translation processing apparatus as claimed in claim 1, wherein the update means converts the update bit from a "0" to a "1" when a first write operation is executed to the corresponding address in the table.

3. A dynamic address translation processing apparatus as claimed in claim 2, wherein the central processing unit has an address conversion buffer for storing the virtual address and the corresponding real address and obtaining the real address indexed by the virtual address.

4. A virtual memory data processing system comprising:
   a main memory for storing an address conversion table including a page table, said address conversion table relating virtual addresses to real addresses; and
   a central processing unit for performing a dynamic address translation operation to translate a virtual address to a real address by referring to the address conversion table, said central processing unit comprises:
   an address conversion buffer for storing, and allowing the high speed retrieval of, a plurality of the virtual addresses and real addresses corresponding to the stored virtual addresses, said address conversion buffer comprising:
   table entries having real addresses corresponding to the virtual addresses of the address conversion table;
   page table entries; and
   page table entry addresses corresponding to the page table entries to allow a high speed determination of a page table entry and a corresponding page table entry address to enable a high speed updating the contents of the page table entries.

* * * * *

UNITED STATES PATENT AND TRADEMARK OFFICE
CERTIFICATE OF CORRECTION

PATENT NO. : 5,497,469
DATED : March 5, 1996
INVENTOR(S) : Sakata et al.

It is certified that error appears in the above-indentified patent and that said Letters Patent is hereby corrected as shown below:

<u>Cover Page</u>, [57] ABSTRACT:
    line 7, after "entry", insert --having an update bit indicative that a page in memory has been written to--;
    line 7, delete "of";
    lines 9-10, delete ", having an update bit indicative that a page in memory has been written to".

<u>Column 1</u>,    line 65, "resister" should be --register--;

<u>Column 2</u>,    line 29, delete "prior art".

<u>Column 4</u>,    line 9, delete "the" (first occurrence)

<u>Column 5</u>,    line 55, "resister" should be --register--;

<u>Column 6</u>,    line 35, "resister" should be --register--;
    line 46, "resister" should be --register--.

Signed and Sealed this

Fifteenth Day of October, 1996

Attest:

BRUCE LEHMAN

*Attesting Officer*     *Commissioner of Patents and Trademarks*